United States Patent
Smook

(10) Patent No.: US 7,828,682 B2
(45) Date of Patent: Nov. 9, 2010

(54) GEARBOX FOR A WIND TURBINE

(75) Inventor: Warren Gregory Smook, Gauteng (ZA)

(73) Assignee: Hansen Transmissions International N.V., Edegem (BE)

( * ) Notice: Subject to any disclaimer, the term of this patent is extended or adjusted under 35 U.S.C. 154(b) by 601 days.

(21) Appl. No.: 11/797,813

(22) Filed: May 8, 2007

(65) Prior Publication Data
US 2007/0265133 A1     Nov. 15, 2007

(30) Foreign Application Priority Data
May 11, 2006   (BE)   ................... 2006/0268

(51) Int. Cl.
F16H 3/72   (2006.01)
F16H 57/08  (2006.01)

(52) U.S. Cl. .................. 475/5; 475/331; 475/346

(58) Field of Classification Search ........... 475/5, 475/331, 346, 347; 290/44; 416/170 R, 416/177
See application file for complete search history.

(56) References Cited

U.S. PATENT DOCUMENTS 6,459,165 B1 * 10/2002 Schoo ..................... 290/1 C
6,814,684 B2 * 11/2004 Schulz et al. ............... 475/331
2002/0187875 A1 * 12/2002 Chang ....................... 475/331

FOREIGN PATENT DOCUMENTS

| CH | 360857 | 4/1962 |
| DE | 172504 | 3/1967 |
| DE | 1922417 | 11/1970 |
| DE | 29 37 845 | 5/1980 |
| GB | 2 002 488 | 2/1979 |
| WO | 01/57415 | 8/2001 |
| WO | 2004/027260 | 4/2004 |
| WO | WO 2006/000214 A1 | 1/2006 |

* cited by examiner

*Primary Examiner*—Roger Pang
(74) *Attorney, Agent, or Firm*—Young & Thompson

(57) ABSTRACT

A gearbox for a wind turbine includes a ring wheel unit provided in a housing; a driving shaft designed to be coupled to the rotor of the wind turbine and a single main bearing or a pair of main bearings which rotatably support the driving shaft in the housing. The ring wheel unit is formed of a sun wheel, a planet wheel, ring wheel which is fixed to the housing in a non-rotating manner and a planet carrier which is rigidly connected to the driving shaft. An additional bearing rotatably supports the planet carrier or the driving shaft relative to the housing. Between the part of the housing having the main bearing or the main bearings and the part of the housing with the additional bearing and the ring wheel, an elastic part is provided with relative torsional stiffness, yet relatively flexible to loads in the axial and/or radial direction.

9 Claims, 8 Drawing Sheets

GEARBOX FOR A WIND TURBINE

BACKGROUND OF THE INVENTION

1. Field of the Invention

The present invention concerns a gearbox for a wind turbine.

In particular, the present invention concerns a gearbox for a wind turbine which consists of ring wheel unit provided in a housing; a driving shaft designed to be coupled to the rotor of the wind turbine and a single main bearing or a pair of main bearings which support the driving shaft such that it can be rotated in the housing, whereby the ring wheel unit is formed of a sun wheel, a planet wheel, ring wheel which is fixed to the housing in a non-rotating manner and a planet carrier which is rigidly fixed to the driving shaft.

2. Discussion of the Related Art

Such gearboxes for wind turbines are already known, whereby the driving shaft is coupled to the rotor of a wind turbine and whereby the sun wheel of the gear unit drives for example a generator.

In the conventional embodiments, the housing of the gearbox is made of several pieces, whereby a first part of the housing is for example a part of the supporting structure in which a couple of main bearings are provided directly in the seatings and whereby a second part of the housing is screwed onto the supporting structure, which part comprises the actual ring wheel unit.

It is also known to embed the main bearings as well as the ring wheel unit in a separate housing which is provided on the supporting structure afterwards.

These are what are called integrated main bearings.

In case of a further integration, the pair of main bearings is replaced by only a single main bearing, such as for example a double cone bearing.

The aim is that the main bearing or the pair of main bearings absorb the loads on the driving shaft due to the aerodynamic wind load as well as the rotor weight and transmit these directly or via the housing of the gearbox to the supporting structure of the wind turbine.

A disadvantage of the known embodiments is that, while the wind turbine is operational, the main bearings are subject to a certain elastic deformation under the influence of the rotor loads, which inevitably results in a certain play in the main bearings, which will cause an alignment error at the ring wheel unit which hinders the good working of the ring wheel unit.

For, a result of the above-mentioned alignment error is that the plays between the flanks of the teeth of the gear wheels can be restricted in some cases or can be entirely absent or, the other way round, may increase.

A disadvantage of all this is that an uneven load of the gear wheels is obtained and that the normal interplay of forces between the gear wheels is disturbed, which will result in the gear wheels and the bearings of the planet wheels being overloaded.

Also, the present invention aims to remedy one or several of the above-mentioned and other disadvantages.

SUMMARY OF THE INVENTION

To this end, the present invention concerns a gearbox for a wind turbine of the above-mentioned type, whereby an additional bearing is provided to support the planet carrier or the driving shaft in a rotating manner in relation to the housing and whereby between the part of the housing in which the main bearing or the main bearings are provided and the part of the housing in which the additional bearing and the ring wheel are provided, there has been provided an elastic part which has a relative torsional stiffness on the one hand and which is relatively flexible on the other hand to loads in the axial direction and/or loads in a radial direction.

An advantage of such a gearbox for a wind turbine according to the invention is that the above-mentioned alignment error that occurs as a result of deformations of the main bearings, the planet carrier, the driving shaft and/or the housing or as a result of plays can be absorbed or compensated for, as the elastic part of the housing makes it possible for the part of the housing in which the ring wheel and the additional bearing have been provided can move in an axial or radial direction in relation to the part of the housing in which the main bearings are embedded.

As a result, the alignment between the ring wheel, the planet carrier, the planet wheels and the sun wheel improves, such that the above-mentioned negative effects due to a bad alignment are avoided.

According to a preferred embodiment of a gearbox according to the invention, the ring wheel, the planet wheels and the sun wheel are placed in the axial direction between the additional bearing and a main bearing.

In this embodiment, the additional bearing supports the planet carrier in a place where the above-mentioned alignment error is relatively large and at a relatively large axial distance in relation to the elastic part.

The resistance exerted by the elastic part to oppose the movement of the part of the housing in which the ring wheel and the additional bearing are situated under the influence of the alignment error, can thus be overcome relatively easily.

For, thanks to the elasticity of the elastic part and the large distance between this elastic part and the additional bearing, the alignment error can be eliminated with only a restricted load on the additional bearing.

In this manner, the planet wheels, the ring wheel and the sun wheel can be correctly aligned again in an efficient manner.

According to another preferred embodiment of a gearbox according to the invention, the load on the additional bearing which supports the planet carrier in relation to the housing of the gear unit is mainly determined by the axial and radial stiffness of the above-mentioned elastic part.

An advantage of this embodiment is that, by designing the elastic part with the appropriate radial or axial stiffness, for example by means of calculations in computer models or by establishing said stiffnesses by experiment, the load on the additional bearing can be restricted, such that the maximum life of this additional bearing can be guaranteed or its dimensions can be limited.

In general, it should be noted that the load on the additional bearing depends on the elasticity of the elastic part, on the distance of the elastic part to the additional bearing, but also on the elasticity of the main bearings.

For, the larger the stiffness of the main bearings, the smaller the alignment error will be at the additional bearing, the less the elastic part must be deformed so as to compensate the alignment error, the less load the additional bearing will thus be subjected to.

BRIEF DESCRIPTION OF THE DRAWINGS

In order to better explain the characteristics of the invention, the following preferred embodiments of a gearbox for a wind turbine according to the invention are described as an example only without being limitative in any way, with reference to the accompanying drawings, in which.

Figure 1:
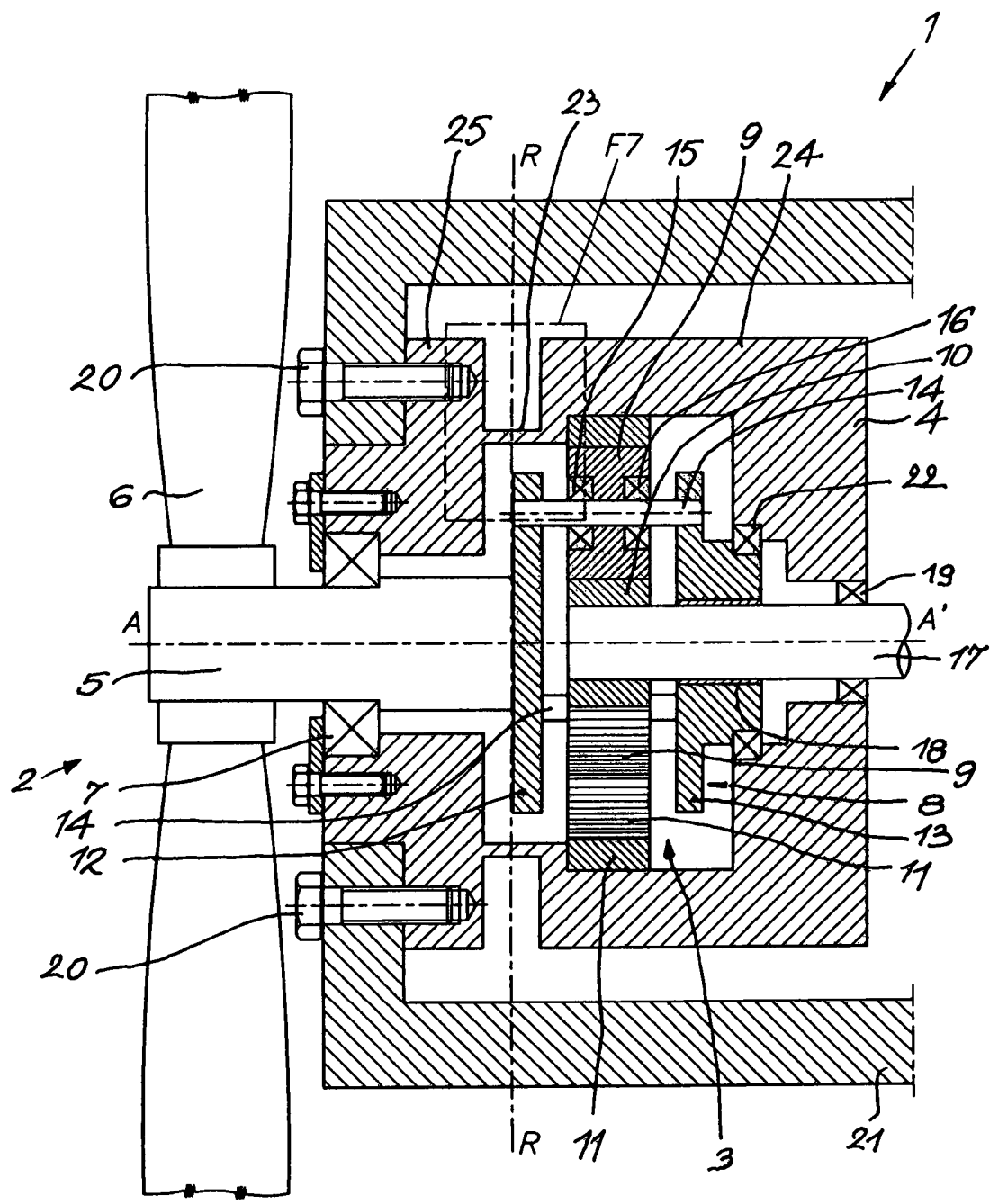
FIG. 1 schematically represents a first embodiment of a gearbox according to the invention, as a section, whereby the driving shaft is supported by means of a single main bearing which is integrated together with the rest of the ring wheel unit in a separate housing.
Figure 2:
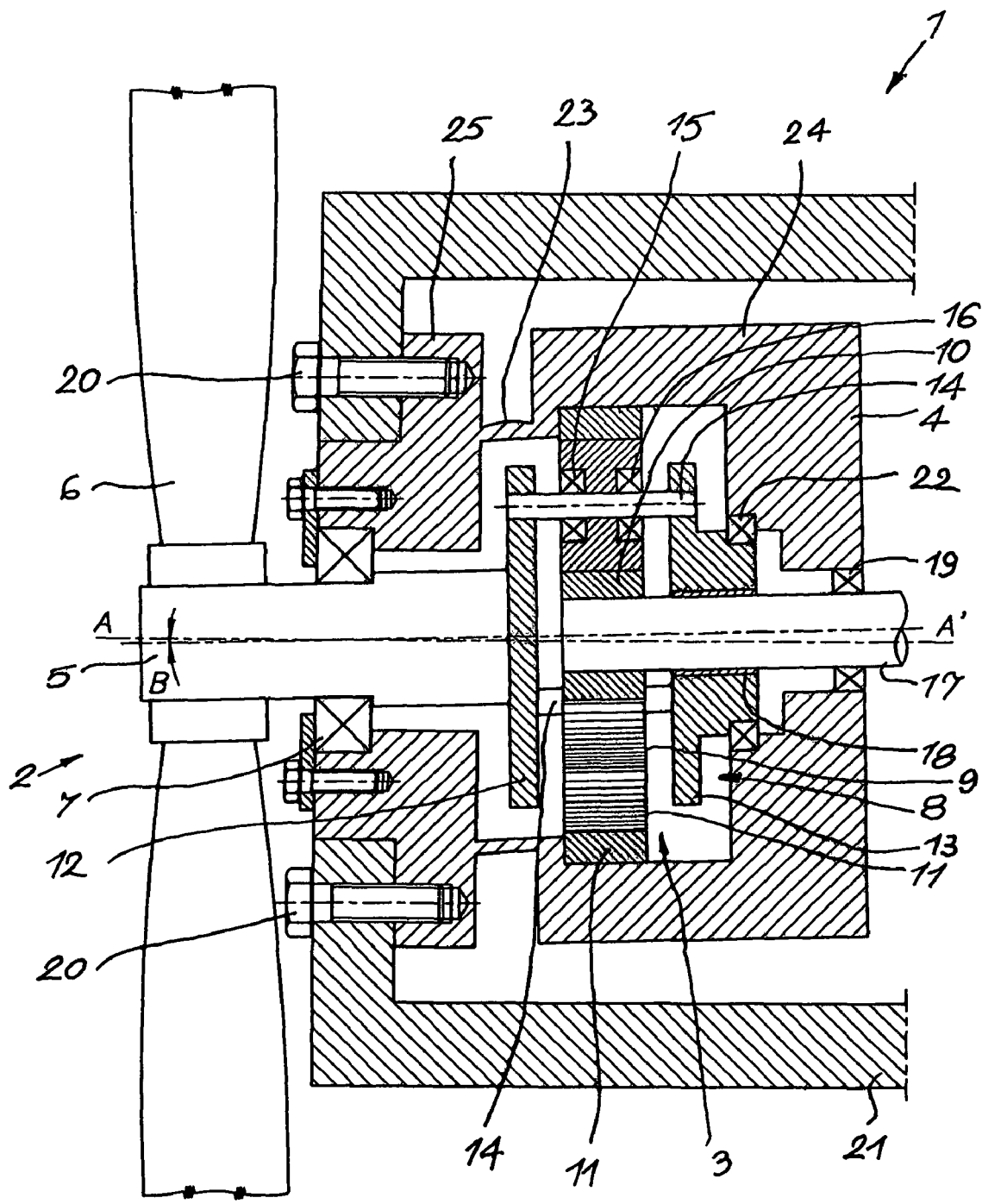
FIG. 2 illustrates the working of a gearbox according to FIG. 1.
Figure 4:
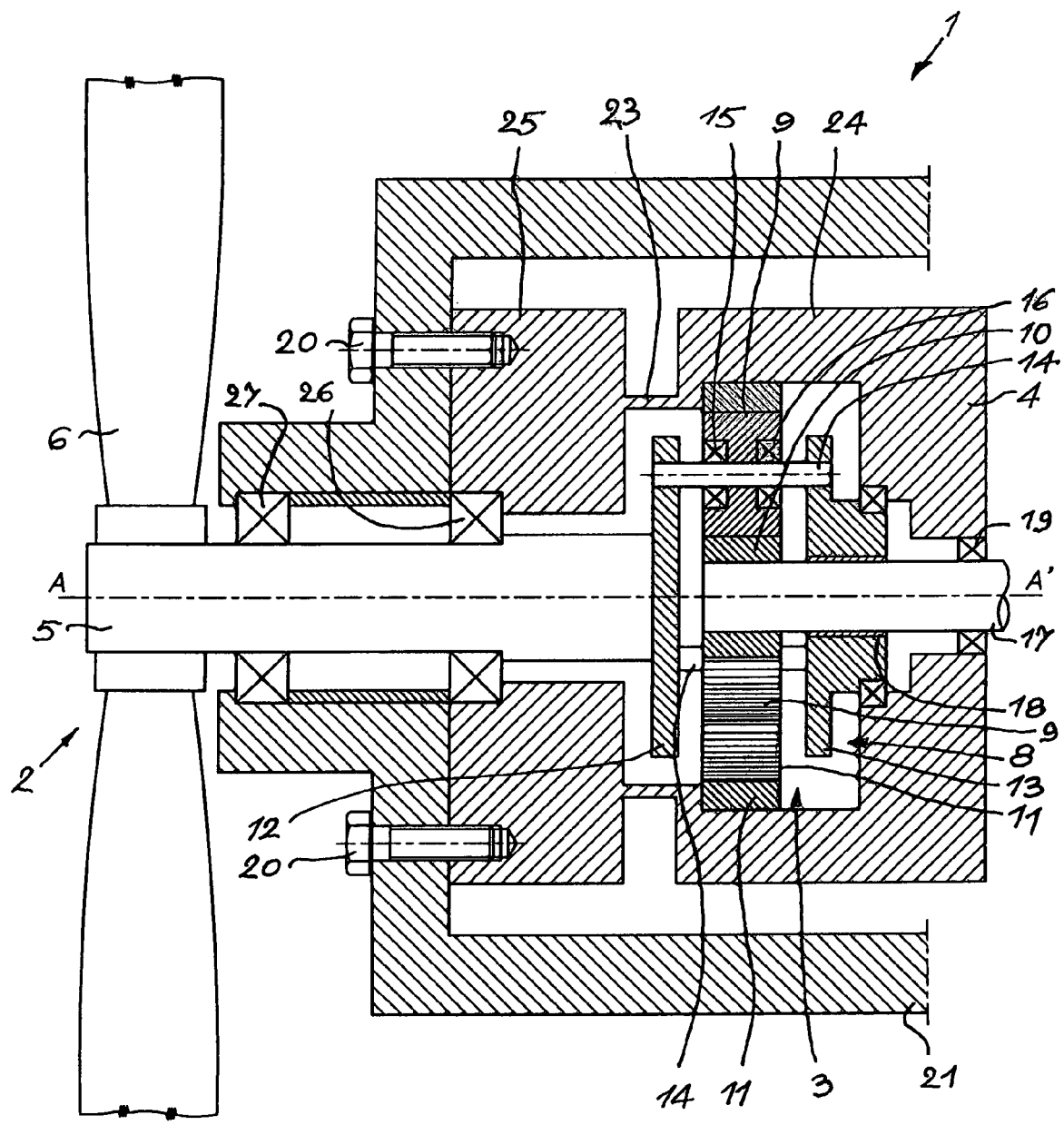
FIG. 4 represents an embodiment which is a mixture of the embodiments from FIGS. 1 and 3, whereby two main bearings support the rotor.
Figure 5:
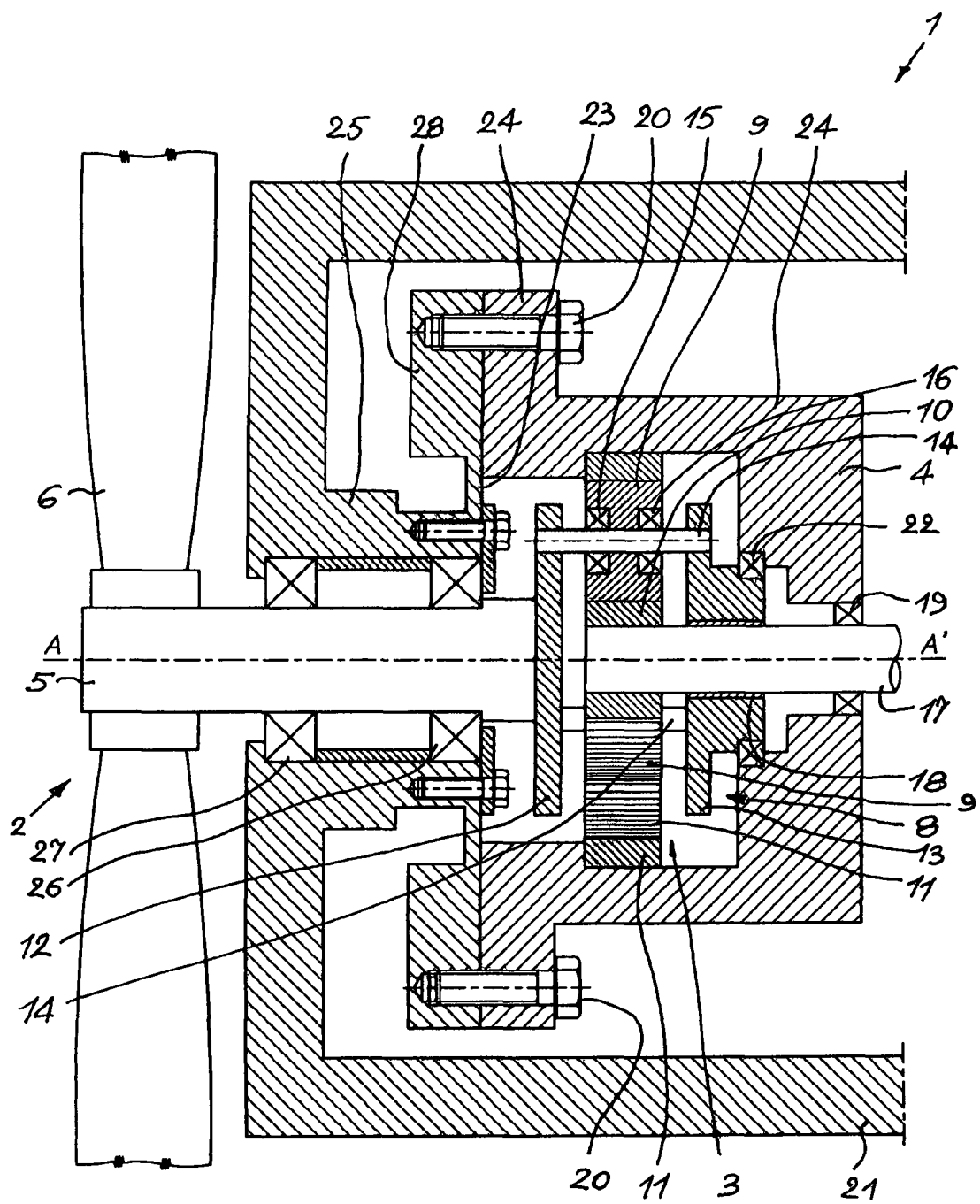
Figure 6:
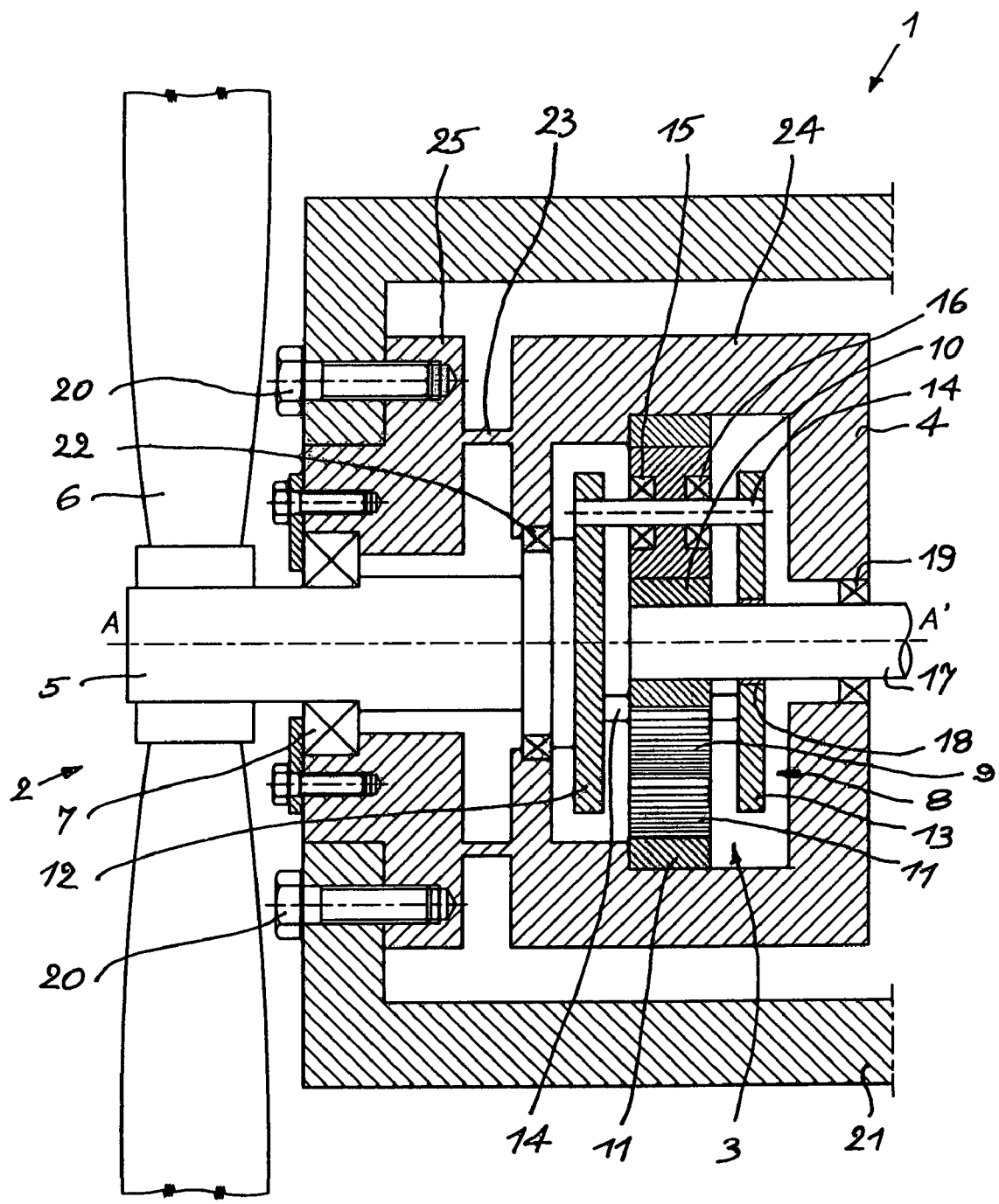
Figure 7:
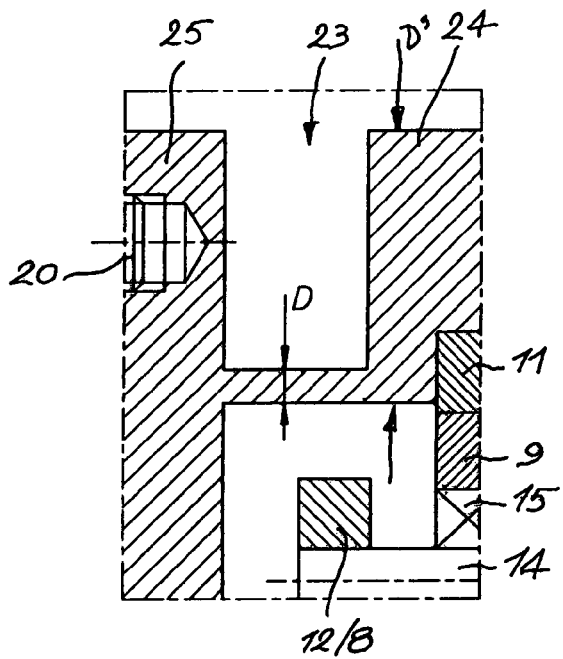
Figure 8:
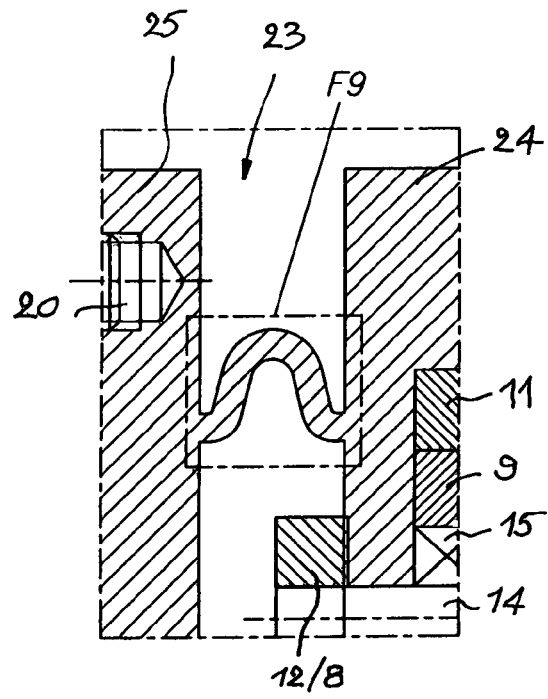
Figure 11:
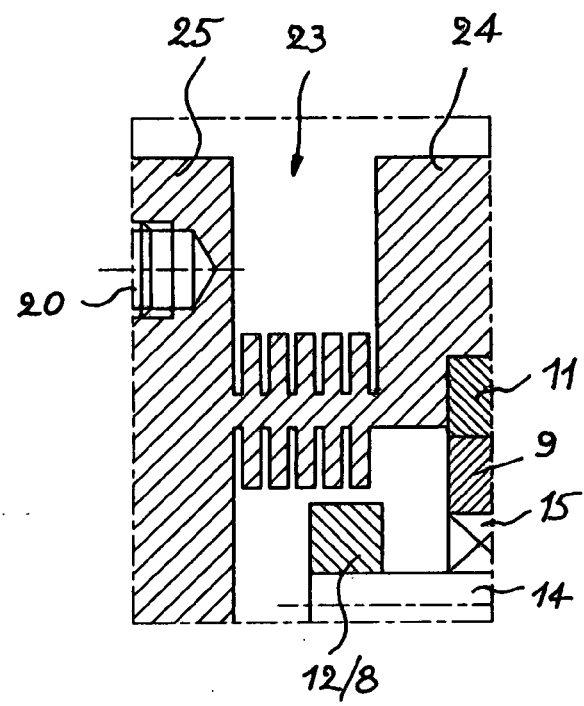
Figure 12:
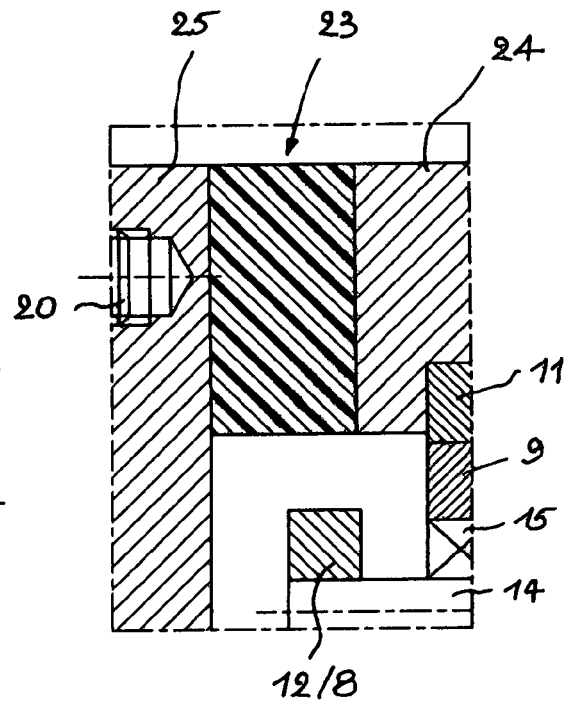
Figure 9:
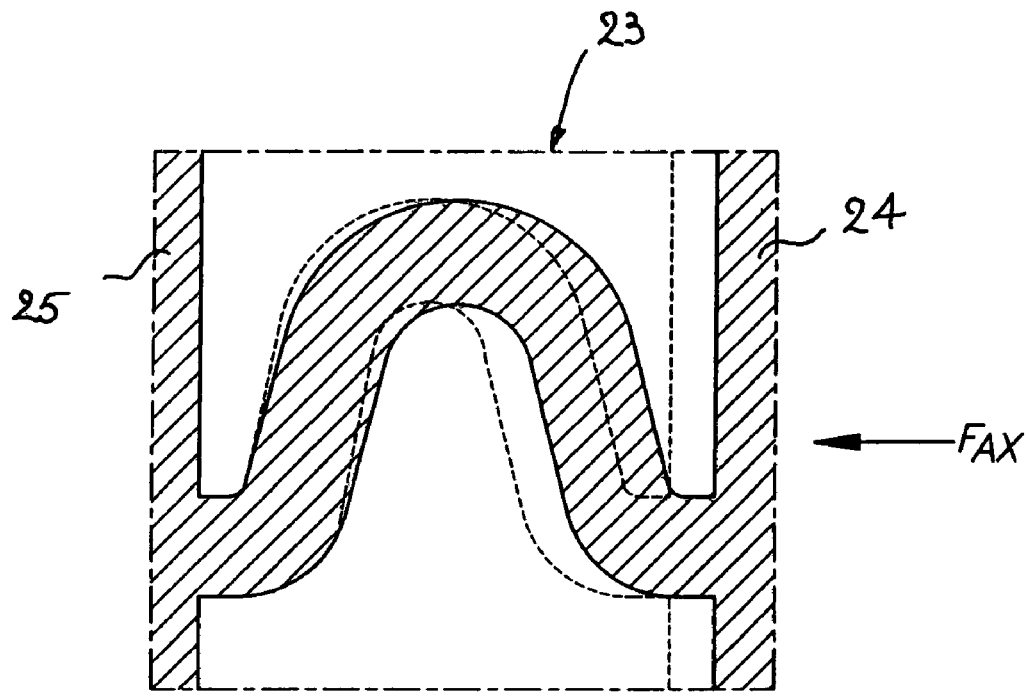
Figure 10:
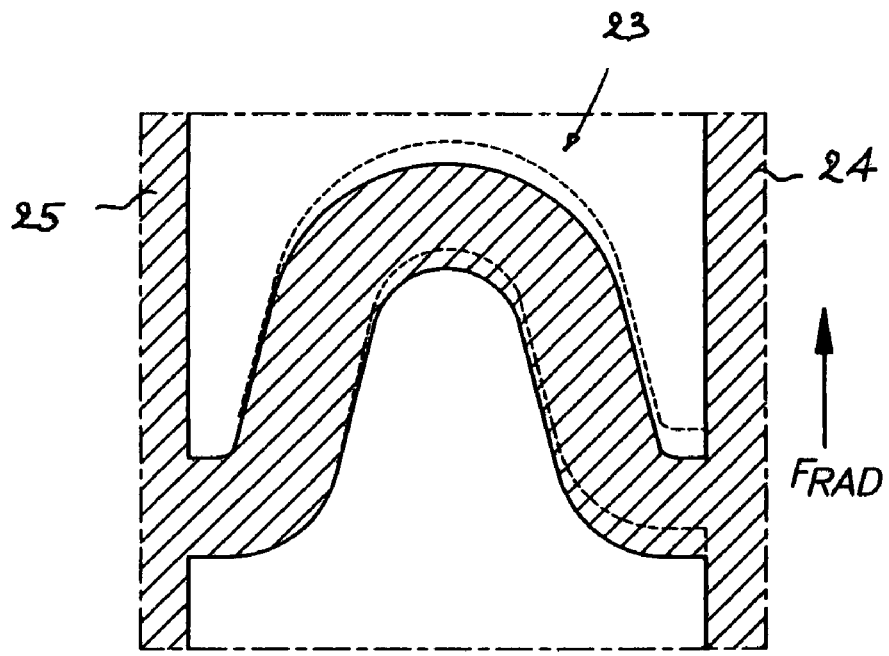

a first main bearing provided in the turbine cradle and a second main bearing which is integrated together with the rest of the ring wheel unit in a separate housing;

FIG. 5 represents an alternative embodiment for the embodiments from FIGS. 1, 2 and 4, whereby an elastic part is provided in the turbine cradle;

FIG. 6 represents an alternative for the embodiment of FIG. 1, whereby the additional bearing has been provided closer to the main bearing;

FIG. 7 represents the part indicated by F7 in FIG. 1 to a larger scale;

FIG. 8 represents an alternative embodiment for the part of FIG. 7;

FIGS. 9 and 10 illustrate the working of the embodiment of FIG. 8; and,

FIGS. 11 and 12 represent yet other embodiments for the part of FIG. 7.

DESCRIPTION OF THE PREFERRED EMBODIMENTS

The gearbox 1 for a wind turbine 2 according to the invention represented in FIG. 1 consists of ring wheel unit 3 provided in a housing 4; a driving shaft 5 which is coupled to the rotor 6 of the wind turbine 2 and a main bearing 7 which supports the driving shaft or rotor shaft 5 in a rotating manner in the housing 4.

The ring wheel unit 3 consists of a planet carrier 8 on which have been provided planet wheels 9, in this case three planet wheels 9 in total, whereby these planet wheels 9 work in conjunction with a sun wheel 10 and ring wheel 11 which is fixed to the housing 4 of the gearbox 1 in a non-rotating manner.

The planet wheels 9 can rotate in relation to the planet carrier 8

To this end, the planet carrier 8 in the given example consists of a first part 12 and a second part 13, which parts are connected to each other by means of shafts 14.

As an alternative, such a planet carrier 8 of what is called the "cage" type can also be made of a single piece by casting the piece in a mould.

On these shafts 14, the planet wheels 9 are bearing-mounted by means of bearings 15 and 16.

The sun wheel 10 is provided on a driven shaft 17, which protrudes through an opening 18 in the second part 13 of the planet carrier 8.

The driven shaft 17 is also supported in a rotating manner in relation to the housing 4 of the gearbox 1, which is schematically represented in the figures, but only to illustrate the principle of the invention in a simple manner, by means of a bearing 19.

In practice, this support of the driven shaft 17 is often obtained as the driven shaft 17 drives a second planetary step, whereby the bearing, which supports the planet carrier of said step in the housing 4, also provides for the support of the driven shaft 17.

In other embodiments, the driven shaft 17 drives for example a transmission with a hollow shaft and a gear wheel whereby, in practice, the support of the driven shaft 17 in the housing 4 again must not be directly provided for by a bearing 19.

Naturally, many alternatives are possible.

Further, the planet carrier 8 is rigidly connected to the rotor shaft 5, such that the rotor shaft 5 together with the planet carrier 8 forms the actual entry of the gear unit 3.

Of course, the aim is to transform the relatively slow rotation of the rotor shaft 5 or driving shaft 5 under the influence of the wind force, via the ring wheel unit 3, in a relatively fast rotation of the driven shaft 17, for example in order to drive a generator or a following step in the gear wheel transmission.

In the given embodiment, the gearbox 1 is provided on a supporting structure 21 of the wind turbine 2 by means of bolts 22, in particular on the turbine cradle, whereby a direct, rigid connection between the gearbox 1 and the supporting structure 21 is realized.

The rotor shaft 5 is in this case bearing-mounted in the housing 4 of the gearbox 1 by means of only a single main bearing 7.

Thanks to the rigid connection between the housing 4 and the supporting structure 21 and the integrated bearing 7 of the rotor shaft 5, the gearbox 1 according to the invention will behave differently from the gearboxes whereby the rotor shaft 5 is bearing-mounted in the supporting structure 21 by means of a pair of main bearings and whereby a spring/damper system has been provided between the gearbox 1 and the supporting structure.

The main bearing 7 is such that the bending moments and the forces caused by the rotor weight on the rotor shaft 5 are mainly absorbed by this bearing 7 and are transmitted to the housing 4 and to the supporting structure 21, whereby the main bearing 7 also provides for an axial and radial positioning of the driving shaft 5 in the housing 4.

A first aspect of the invention consists in also providing an additional bearing 22 which supports the planet carrier 8 in a rotating manner in relation to the housing 4 of the gearbox 1.

Another aspect of the invention consists in providing an elastic part 23 in the housing 4 which has a relative torsional stiffness on the one hand and which is relatively flexible to loads in the axial direction AA' and/or in a radial direction RR' on the other hand.

This elastic part 23 is placed such that the part 24 of the housing 4 in which the additional bearing 22, the ring wheel 11, as well as the driven shaft 17 are provided such that they can move somewhat in relation to the part 25 of the housing 4 in which the main bearing 7 has been provided.

The principle of a gearbox 1 according to the invention is simple and is illustrated hereafter by means of FIG. 2.

The main bearing 7 of the gearbox 1 is dimensioned large enough to absorb the bending moments and forces on the rotor shaft 5 caused by the rotor weight and the wind load and to transmit them to the housing 4 and the supporting structure 21.

However, because of the extent of the above-mentioned forces that are active on the rotor shaft 5, it is inevitable that the main bearing 7, the rotor shaft 5, the planet carrier 8 and/or the housing 4 of the gearbox 1 undergo a certain deformation.

Moreover, there is in general also a certain play in the main bearing 7.

FIG. 2 represents said deformations and plays in a strongly simplified manner and to an exaggerated scale by means of an angular displacement B of the rotor shaft 5.

Naturally, in practice the situation will be far more complex.

If no additional bearing 22 or elastic part 23 was provided, as is the case with the known gearboxes, due to the above-mentioned effects, after applying a load, the driving shaft or rotor shaft 5 would no longer be symmetrically aligned to the driven shaft 17, such that a certain alignment error B would occur between the driving shaft 5 and the driven shaft 17.

As a result of such an alignment error B, the planet wheels 9 would no longer be well aligned in relation to the ring wheel 11 and the sun wheel 10, which would hinder the good working order of the ring wheel unit 3.

However, since according to the invention the planet carrier 8 is additionally supported in the housing 4 by the bearing 22 and since an elastic part 23 is provided in the housing 4 between the above-mentioned parts 24 and 25, the part 24 of the housing 4 will be able to follow the movement of the rotor shaft 5 relatively easily.

FIG. 2 again represents this in a simplified manner by displacing the part 24 over an angle B in relation to the other part 25 of the housing 4.

It is clear that in this manner, the different gear wheels 9, 10 and 11 of the ring wheel unit 3, as well as the driving shaft 5 and the driven shaft 17 are again well aligned in relation to each other, which was one of the aims of the invention.

FIGS. 3 to 6 represent other embodiments of gearboxes 1 for wind turbines according to the invention.

Figure 3:
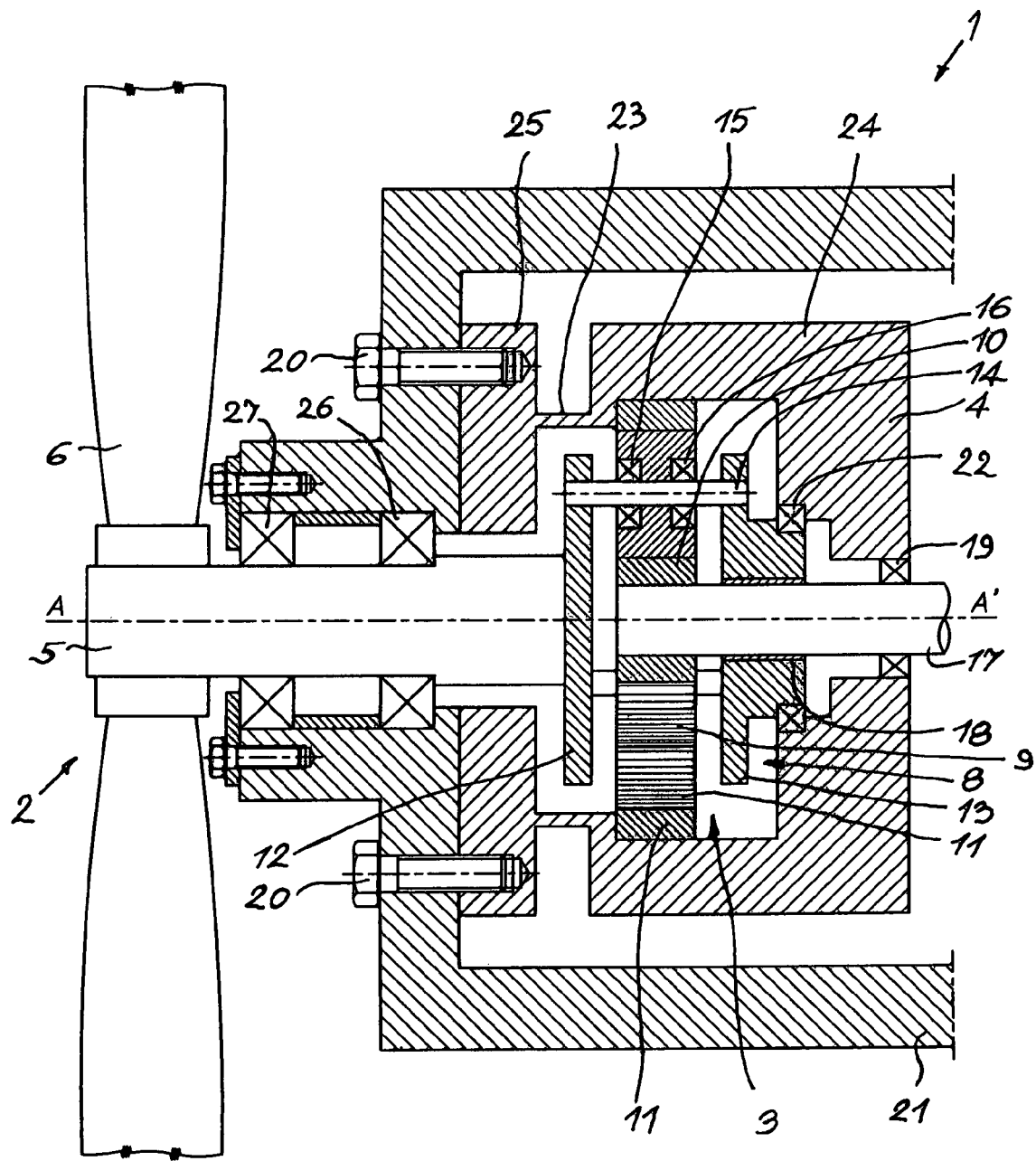
FIG. 3, analogous to FIG. 1, represents an embodiment of a gearbox according to the invention whereby the rotor is supported by two main bearings provided directly in the turbine cradle.

The alternative of FIG. 3 consists in supporting the rotor shaft 5 not by merely one main bearing 9, but by a couple of main bearings 26 and 27.

Moreover, said main bearings 26 and 27 are not integrated in a separate housing 4 of the gearbox 1 in which the ring wheel unit 3 is provided as well, but said main bearings 26 and 27 are directly provided in the supporting structure 21 of the wind turbine 2.

In other words, the housing 4 of the gearbox 1 is partly integrated in the supporting structure 21 of the wind turbine 2.

Naturally, this does not change the working of the gearbox 1 in any way, and an alignment error B can be remedied just as well with this embodiment.

FIG. 4 represents an intermediate form whereby two main bearings 26 and 27 are provided as well, but whereby one ma in bearing 26 is integrated in the housing 4 of the gear unit 1, whereas the other main bearing is integrated in the supporting structure 21.

Again, put the other way, the housing 4 of the gearbox 1 is partly integrated in the supporting structure 21 of the wind turbine 2.

Naturally, the working of this embodiment is entirely analogous to the preceding embodiments.

FIG. 5 represents yet another variant according to the invention, whereby the elastic part 23 is this time not provided in the housing 4 of the gearbox 1, but in the supporting structure 21.

Again, a part of the housing 4 of the gearbox 1 is integrated in the supporting structure 21 in this case.

This does not alter the principle of the invention, as long as it is made sure that the part 24, formed of the housing 4 of the gearbox 1 and the part 29 of the supporting structure 21 between the elastic part 23 and the housing 4, in which the ring wheel 11 and the additional bearing 2 are held, can follow the movement of the driving shaft 5 in relation to the part 25 of the supporting structure 21 in which the main bearings 26 and 27 have been provided.

This is clearly the case in the embodiment shown.

In all the embodiments discusses until now, the ring wheel 11, the planet wheels 9 and the sun wheel 10 are placed in the axial direction AA' between the additional bearing 22 and a main bearing 7, 26 or 27.

In the embodiment of FIG. 6, however, an additional bearing 22 has been provided between the ring wheel unit 3 and the supporting structure 21.

If the elastic part 23 is placed right, it is made sure that the part 24 of the housing 4, which contains said additional bearing 22 as well as the gear unit 3, can still move in relation to the part 25 of the housing 4 in which the main bearing 7 is integrated, such that the principle of the invention still holds.

It is clear that in the embodiments of FIGS. 1 to 5, the additional bearing 22 is placed there where the alignment error B threatens to be the largest and at a sufficient axial distance L from the elastic part 23.

As a result, a small deviation from the rotor shaft 5 has a large effect on the additional bearing 22, and moreover the resistance exerted by the elastic part 23 against the movement of the part 24 of the housing 4 or the supporting structure 21 under the influence of deformations or plays B can be easily overcome without any imminent threat of overload on the additional bearing 22.

In the embodiment of FIG. 6, the deviation at the additional bearing 22, as well as the moment arm L' are much smaller.

This means that, in order to be able to compensate a same alignment error B and assuming that in all the embodiments, an elastic part 23 is applied with equally large radial and axial elasticities, the forces acting on an additional bearing 22, as in FIGS. 1 to 5, will be smaller than in the case of FIG. 6.

The load on the additional bearing 22 is mainly determined by the axial and radial stiffness of the elastic part 23 and the moment arm L or L', but also by the stiffness of the main bearing 7.

However, by adjusting the characteristics of the elastic part 23, the desired effect can be obtained for the different embodiments.

The embodiment according to FIG. 6 can for example be selected to facilitate the mounting or the like.

FIG. 7 represents the elastic part 23 to a larger scale, whereby the elasticity of the elastic part 23 is obtained in this embodiment by giving this part other dimensions than the surrounding parts 24 and 25 of the housing 4.

In particular, the thickness D of the elastic part 23 is smaller than the thickness D' of the surrounding parts 24 and 25 of the housing 4.

FIG. 8 represents a preferred alternative embodiment for the elastic part 23, whereby the elastic part 23 is provided with a cross-section which is U-shaped.

This embodiment is particularly interesting as the elastic part 23 is very flexible when it is subjected to a force Fax in the axial direction AA', as is illustrated by means of FIG. 9, or to a force Frad in a radial direction RR', as is illustrated by means of FIG. 10.

As a result, the above-mentioned alignment error B can be easily compensated for.

On the other hand, the elastic part 23 has a sufficient torsional stiffness, such that it can absorb the reaction moments acting on the ring wheel 11 without any problems.

FIG. 11 represents yet another embodiment for the elastic part 23, whereby this part 23 is this time formed by providing the housing 4 with a certain molding.

Such a molding can be formed by omitting certain parts of the housing 4 so as to obtain the required radial and axial flexibility, and it does not need to be uniform over the entire perimeter of the housing 4, for example.

In the alternative embodiment for the elastic part 23 represented in FIG. 12, the elasticity is obtained by making the part 23 of the housing 4 of a material which is more elastic than the surrounding parts 24 and 25 of the housing 4, for example of a synthetic material or the like.

According to the invention, the elastic part 23 is not necessarily uniform over the perimeter.

The present invention is by no means limited to the embodiments described as an example and represented in the accompanying drawings; on the contrary, such a gearbox for a wind turbine according to the invention can be made in different shapes and dimensions while still remaining within the scope of the invention.

The invention claimed is:

1. A gearbox for a wind turbine, comprising:
   a ring wheel unit in a housing;
   a driving shaft designed to be coupled to a rotor of the wind turbine and a single main or a pair of main bearings which supports the driving shaft such that it can rotate in the housing,
   wherein the ring wheel unit is formed of a sun wheel, a planet wheel, a ring wheel which is fixed to the housing in a non-rotating manner, and a planet carrier which is rigidly connected to the driving shaft,
   wherein an additional bearing is provided to support the planet carrier or the driving shaft in a rotating manner in relation to the housing, and
   wherein an elastic part connects a first part of the housing in which the main bearing or the main bearings are provided and a second part of the housing in which the additional bearing and the ring wheel are provided, the elastic part having a relative torsional stiffness and being relatively flexible to loads in the axial direction and/or to loads in a radial direction compared to surrounding parts of the housing.

2. The gearbox according to claim 1, wherein the elasticity of the elastic part is due to the fact that this part of the housing has other dimensions than the surrounding parts of the housing.

3. The gearbox according to claim 2, wherein the thickness of the elastic part is smaller than the thickness of the surrounding parts of the housing.

4. The gearbox according to claim 1, wherein the elastic part is provided with a molding.

5. The gearbox according to claim 1, wherein the elastic part is formed of a material which is more elastic than the surrounding parts of the housing.

6. The gearbox according to claim 1, wherein loads on the additional bearing are mainly determined by the axial and radial stiffness of the above-mentioned elastic part.

7. The gearbox according to claim 1, wherein the elastic part is provided with a cross section which is U-shaped.

8. The gearbox according to claim 1, wherein the housing of the gearbox is partly integrated in a supporting structure of the wind turbine.

9. The gearbox according to claim 8, wherein the main bearing or at least one of the main bearings is integrated in the supporting structure.

\* \* \* \* \*